(12) United States Patent
Fukuzawa et al.

(10) Patent No.: US 6,249,328 B1
(45) Date of Patent: Jun. 19, 2001

(54) LIQUID CRYSTAL DISPLAY DEVICE HAVING RED, GREEN, AND BLUE FLUORESCENT LAMPS HAVING A PARTICULAR PHOSPHOR COMPOSITION OR A DOUBLE TUBE LAMP

(75) Inventors: Tadashi Fukuzawa; Shigeo Shionoya, both of Tokyo-to (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/114,607

(22) Filed: Jul. 13, 1998

(30) Foreign Application Priority Data

Oct. 10, 1997 (JP) .................................. 9-244977

(51) Int. Cl.$^7$ ................................................ G02F 1/1335
(52) U.S. Cl. ........................................................ 349/70
(58) Field of Search .................................................. 349/70

(56) References Cited

U.S. PATENT DOCUMENTS

| 3,798,464 |   | 3/1974 | Luursema | 307/141 |
|---|---|---|---|---|
| 4,177,401 | * | 12/1979 | Yamane et al. | 313/485 |
| 4,386,826 | * | 6/1983 | Stolov | 349/70 |
| 4,748,546 | * | 5/1988 | Ukrainsky | 349/70 |
| 5,307,186 | * | 4/1994 | Izumi et al. | 349/24 |
| 5,504,599 | * | 4/1996 | Okibayashi et al. | 349/69 |

FOREIGN PATENT DOCUMENTS

| 48-037669 |   | 11/1973 | (JP) | G09K/1/54 |
|---|---|---|---|---|
| 55-137661 |   | 10/1980 | (JP) | H01J/61/34 |
| 56-116778 | * | 9/1981 | (JP) . | |
| 58-18847 | * | 2/1983 | (JP) . | |
| 63-092330 |   | 6/1988 | (JP) | G02K/1/133 |
| 10-333589 |   | 12/1989 | (JP) | G09F/9/00 |
| 3-025850 |   | 2/1991 | (JP) | H04J/61/34 |
| 4-338996 |   | 11/1992 | (JP) | G02F/1/1335 |
| 5-059358 |   | 3/1993 | (JP) | C09K/11/08 |
| 5-0822103 |   | 4/1993 | (JP) | H01J/65/04 |
| 6-138459 |   | 5/1994 | (JP) | G02F/1/1335 |
| 6-222360 |   | 8/1994 | (JP) | G02F/1/1335 |
| 8-092549 |   | 9/1994 | (JP) | G09K/11/08 |
| 6-287553 | * | 10/1994 | (JP) . | |
| 6-294963 |   | 10/1994 | (JP) | G02F/1/1335 |
| 6-301004 |   | 10/1994 | (JP) | G02F/1/13 |
| 6-301032 |   | 10/1994 | (JP) | G05F/1/1335 |
| 7-065618 |   | 3/1995 | (JP) | F21V/8/00 |
| 7-159755 |   | 6/1995 | (JP) | G02F/1/133 |
| 8-248382 |   | 9/1996 | (JP) | G02F/1/133 |
| 8-286184 |   | 11/1996 | (JP) | G02F/1/1335 |
| 9-067567 |   | 3/1997 | (JP) | C09K/11/08 |
| 9-090135 |   | 4/1997 | (JP) | G02B/6/00 |
| 9-265073 |   | 10/1997 | (JP) | G02F/1/133 |
| 10-140150 | * | 5/1998 | (JP) . | |
| 10-333590 |   | 12/1998 | (JP) | G09F/9/09 |
| 10-333591 |   | 12/1998 | (JP) | G09F/9/00 |

* cited by examiner

*Primary Examiner*—Walter J. Malinowski
(74) *Attorney, Agent, or Firm*—J. P. Sbrollini

(57) ABSTRACT

A white cold-cathode fluorescent lamp, which is used as an illumination backlight for liquid crystal, is replaced by cold-cathode fluorescent lamps that emit red, green and blue lights, respectively. Since a liquid crystal picture is illuminated by the fluorescent lights in a time-sequential manner, a multi-color display can be provided without spatially dividing liquid crystal pixels using a color filter; and as it is not necessary for one pixel to be divided into three color cells, the size of a pixel can be reduced. Furthermore, in the liquid crystal display device, a phosphor having a short emission life is employed to coat the interior of the cold-cathode fluorescent lamp and enable the cold-cathode fluorescent lamp to be turned on and off rapidly, so that degradation of display colors due to slow fluorescence decay can be prevented and moving pictures can be displayed.

14 Claims, 6 Drawing Sheets

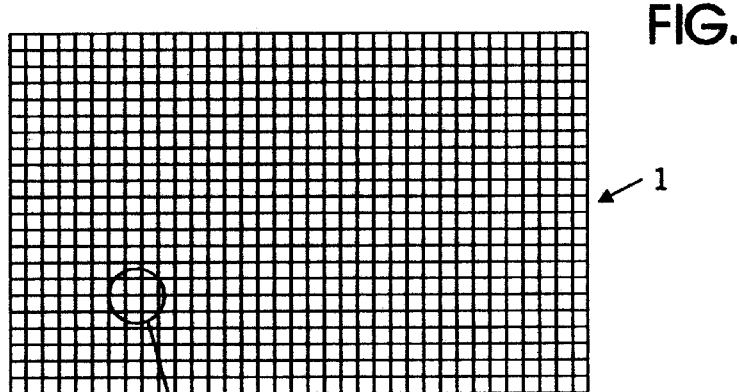
FIG. 1
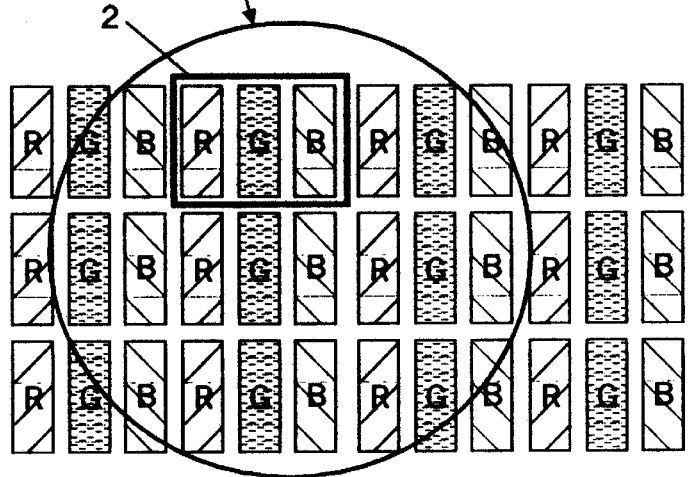
FIG. 1A
FIG. 4
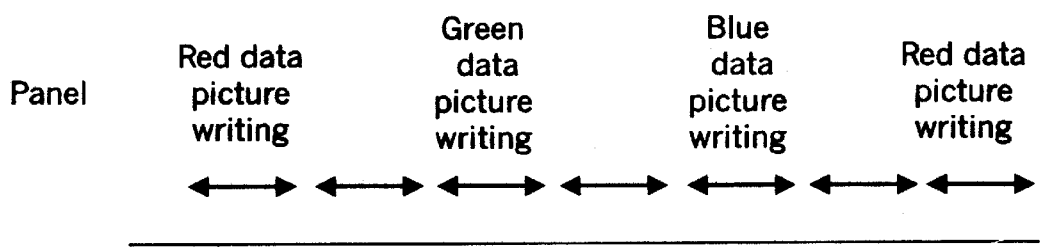

LIQUID CRYSTAL DISPLAY DEVICE HAVING RED, GREEN, AND BLUE FLUORESCENT LAMPS HAVING A PARTICULAR PHOSPHOR COMPOSITION OR A DOUBLE TUBE LAMP

FIELD OF THE INVENTION

The present invention relates to a liquid crystal color display device used for a television picture tube or a computer monitor, and particularly to a display device having a high spatial resolution.

BACKGROUND OF THE INVENTION

Recently liquid crystal color display devices are widely used because of their power and space saving properties. Pixels for a conventional liquid crystal color display device arrangement are illustrated in FIG. 1. As is shown in FIG. 1, a pixel 2 is composed of a set of three, red, blue and green, independently positioned liquid crystal cells. For each pixel 2, the strength of transmitted light is altered by an electric field, with an additive color mixture process being performed to provide a multi-color display.

FIG. 2 is a conceptual cross-sectional view of one pixel for a conventional liquid crystal display device. Voltages applied to the red, green and blue cells are adjusted by a TFT (thin-film transistor) 9, and the orientation of a liquid crystal layer 7 under the cells is changed in order to control the transmission of light emitted by a backlight 13. When white light transmitted through the liquid crystal layer 7 passes through red, green and blue color filters 5, red, green and blue colors are displayed, and the color for each pixel can be varied. An aluminum plate 12 is provided to efficiently reflect the light from the white backlight 13, and a pattern is screen-printed on a diffusion plate 15 to efficiently and uniformly reflect the light from the backlight 13.

With this arrangement, a problem exists in relation to increases in resolution. When pixel 2 is to be activated, three liquid crystal cells must be independently driven, and accordingly, three TFTs are required. Further, the sizes of cells must be reduced in order to increase the resolution. However to efficiently drive the liquid crystals, the size of the transistors is not reduced proportionately to the size of the cells. Further in accordance with an increase in resolution, the opening ratio for a cell (the ratio of a portion whereat light is transmitted and color can be seen, to a non-opening portion such as a transistor and wiring) is small and precisely forming three different color filters in a tiny area will increase the manufacturing costs for a liquid crystal color display device.

To resolve these problems, a new display method has been proposed. According to this method, color filters are removed from a liquid crystal color display device; the entire liquid crystal picture frame is changed from a red picture to a green picture, and to a blue picture in a field-sequential manner; and light illuminated from the rear is varied from red, to green, to blue in synchronization with the picture changes. This method is employed, for example, for a compact liquid crystal color display device (e.g., KOPIN Corporation's cyber Display (trademark) 320) that uses red, green and blue light emitting diodes for illumination. However, since the light emitting diodes are point light sources, a great number of diodes are required for a liquid crystal color display device that has a large picture frame, and manufacturing costs are very high.

A low-cost, cold-cathode fluorescent lamp having a high luminous efficiency for a liquid crystal color display device has been proposed by Bright Institute and others, wherein three cold-cathode fluorescent lamps, for red, green and blue, are pulse-operated (article on Nippon Keizai Shinbun, Jun. 5th, 1997). The switching time for a color picture frame display of this liquid crystal color display device is reported as 15 to 20 ms. However. acolor switching time of 5.56 ms required to obtain 60 pictures per second, which is the same as that of a television picture frame.

According to the method for pulse-operating three colored cold-cathode fluorescent lamps, the dynamic characteristic for luminous efficiency of a phosphor, which is coated on the tube of a fluorescent lamp, is extremely important. When rise and decay characteristics of the fluorescence of the phosphors are inferior, emitted light can not be used efficiently. Furthermore, light infiltrates a picture that is being written, or the preceding color is mixed with the colors of the next picture, reducing color purity.

Since there are few phosphors that have excellent fluorescent transient characteristics, it is difficult to find a phosphor that satisfies the need not only for excellent dynamic properties while providing other desired properties. For example, a phosphor having excellent dynamic properties may react with mercury that is included in a filler gas and deteriorate, or the peak of the luminous efficiency spectrum is not sharp, so that color quality is not always adequate.

Therefore, it is one object of the present invention to provide a liquid crystal color display device incorporating cold-cathode fluorescent lamps that employ phosphors having a fast transient characteristics suitable for employment in the above described field-sequential manner.

It is another object of the present invention to provide a liquid crystal color display device of a field-sequential type that can employ a phosphor that reacts with a filler gas containing mercury and is easily deteriorated.

It is an additional object of the present invention to provide a liquid crystal color display device of field-sequenitial type that demonstrates improved color rendering properties.

SUMMARY OF THE INVENTION

According to the present invention, a liquid crystal display device capable of providing a multi-color display without color filters having different colors for each pixel, comprises: a red cold-cathode fluorescent lamp containing a red phosphor, a green cold-cathode fluorescent lamp containing a green phosphor, and a blue cold-cathode fluorescent lamp containing a blue phosphor, the red cold-cathode fluorescent lamp, the green cold-cathode fluorescent lamp and the blue cold-cathode fluorescent lamp being illuminated sequentially, and the red phosphor being $(SrMg)_3(PO_4)_2:Sn^{2+}$ or $CaS:Eu^{2+}$.

Furthermore, according to the present invention, a liquid crystal display device is provided wherein the green phosphor is $Y_3(Al, Ga)_5O_{12}:Ce^{3+}$.

In addition, according to the present invention, a liquid crystal display device is provided wherein the blue phosphor is $Y_2SiO_5:Ce^{3+}$.

Further, according to the present invention, a liquid crystal display device is provided wherein the red phosphor is $(SrMg)_3(PO_4)_2:Sn^{2+}$ or $CaS:Eu^{2+}$, the green phosphor is $Y_3(Al, Ga)_5O_{12}:Ce^{3+}$, and the blue phosphor is $Y_2SiO_5:Ce^{3+}$.

According to the present invention, a liquid crystal display device capable of providing a multi-color display without color filters having different colors for each pixel, comprises: a red cold-cathode fluorescent lamp containing a red phosphor, a green cold-cathode fluorescent lamp containing a green phosphor, and a blue cold-cathode fluorescent lamp containing a blue phosphor, the red cold-cathode fluorescent lamp, the green cold-cathode fluorescent lamp and the blue cold-cathode fluorescent lamp being illuminated sequentially, while at least one of the red cold-cathode fluorescent lamp, the green cold-cathode fluorescent lamp and the blue cold-cathode fluorescent lamp is a double-tube cold-cathode fluorescent lamp, which is made of an ultraviolet transmitting material, wherein a filler gas containing mercury is sealed in an inner tube and a phosphor is coated In a gap between an outer tube and the inner tube.

According to the present invention, a liquid crystal display device is provided wherein the double-tube cold-cathode fluorescent lamp contains a red phosphor $CaS:Eu^{2+}$.

In addition, according to the present invention, a display device is provided wherein the red cold-cathode fluorescent lamp and a color filter for cutting a short wave are combined, or the green cold-cathode fluorescent lamp and a color purity enhancement color filter are assembled together.

BRIEF DESCRIPTION OF THE DRAWINGS

FIG. 1 is a conceptual diagram of pixels in a conventional liquid crystal display device.

FIG. 4 is a conceptual diagram showing a method for driving the liquid crystal display device of the present invention.

DETAILED DESCRIPTION

Figure 2:
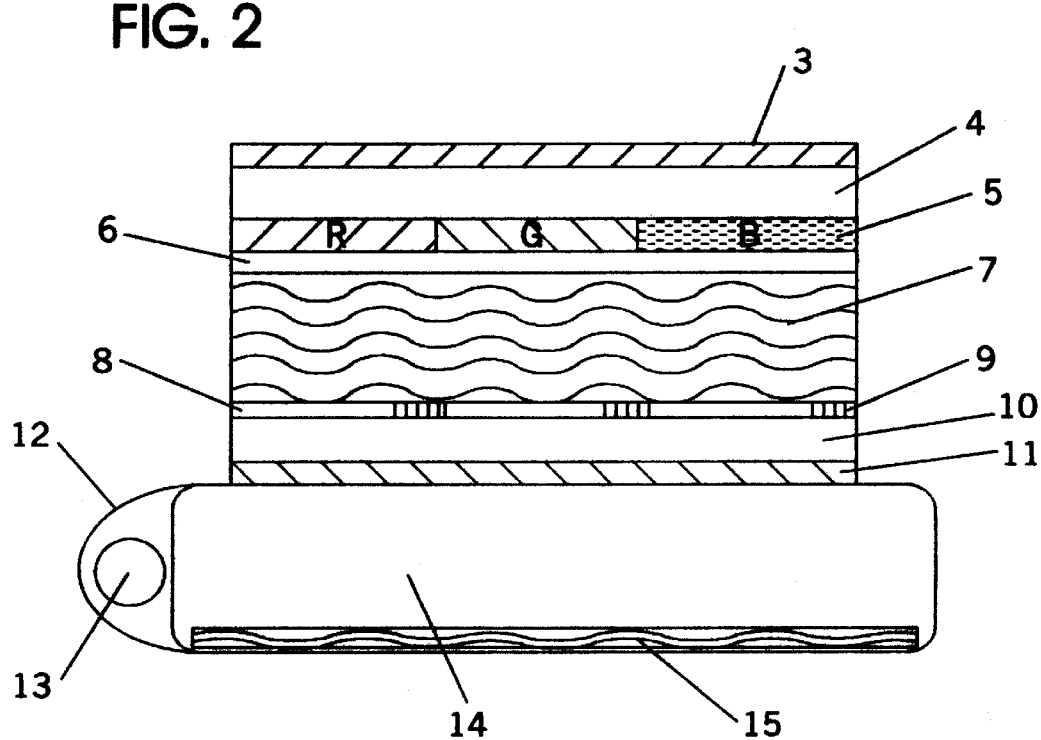
FIG. 2 is a cross-sectional view of the conventional liquid crystal display device.
Figure 3:
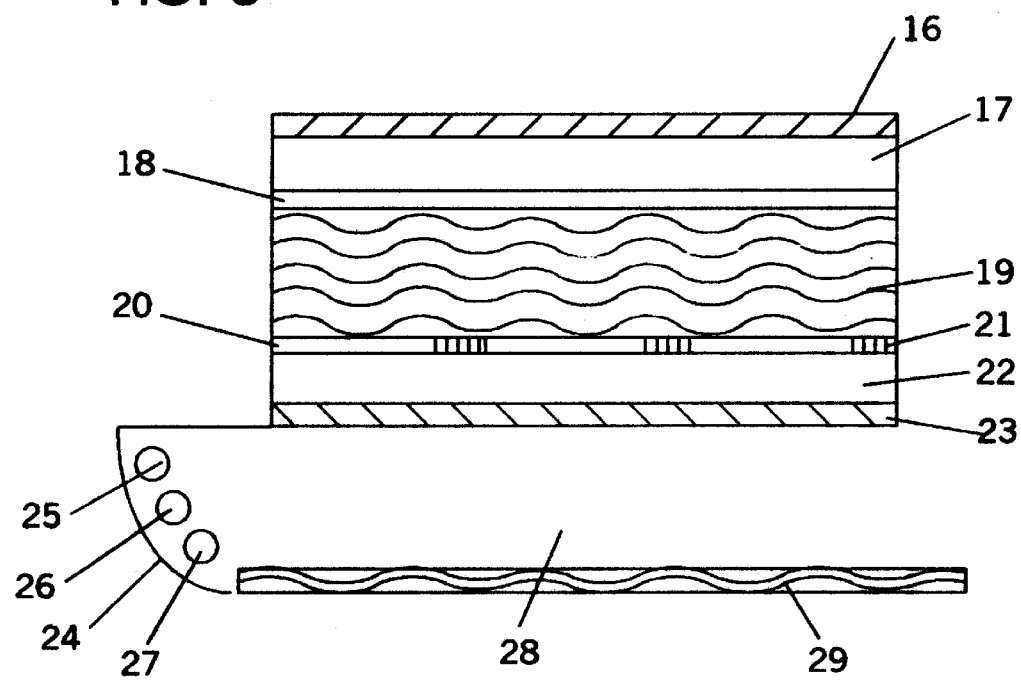
FIG. 3 is cross-sectional view of a liquid crystal display device according to the present invention.

The present invention will now be described in detail while referring to the drawings. FIG. 3 is a cross-sectional view of a liquid crystal display device that employs red, green and blue cold-cathode fluorescent lamps 25, 26 and 27, of the present invention that have excellent fast-transient characteristics. The size of the liquid crystal display device described in FIG. 3 is the same as that of the conventional one in FIG. 2. The display device in FIG. 3 differs from the display device in FIG. 2 in that the color filters 5 in FIG. 2 are replaced by three cold-cathode fluorescent lamps. Further, one pixel of the conventional liquid crystal display device in FIG. 2 corresponds to three pixels in FIG. 3. In other words, the resolution can be increased three times over the conventional technique for a liquid crystal display device. If a very high resolution is not required, the sizes of the individual cells can be increased to facilitate the process, or one pixel equivalent in size to three cells of FIG. 1 can be driven by a single TFT to increase the opening ratio.

The upper portion in FIG. 4 represents the timing used when writing to a liquid crystal picture frame, and the lower portion represents the timing used for the turning on of three cold-cathode fluorescent lamps that are employed as a backlight. First, red picture data are written to the entire liquid crystal picture of the display device, and when the writing has been completed a red picture is acquired by turning on the red cold-cathode fluorescent lamp. Then, the red picture is sustained for a period of time until the red cold-cathode fluorescent lamp is turned off. Following this, the green picture data are written to the liquid crystal display picture frame, and after the writing has been completed, the green cold-cathode fluorescent lamp is turned on. Thereafter, the writing of blue, red and green data, and the illumination of those colors are repeated as a timed series. If the writing characteristics are poor or the transient illumination properties are weak, the length of the repetition cycle is extended, or the ON time period is shortened and a dark picture frame occurs.

The cold-cathode fluorescent lamps of the invention have excellent color rendering properties (color reproduction) and transient response properties. They produce the nearly rectangular light pulse waves that are required for repeated cycles, and maintain an adequate brightness, so that they support the display of the same motion pictures as are displayed by a TV.

A cold-cathode fluorescent lamp of the present invention may have a double-tube structure made of an ultraviolet transmitting material. A filler gas containing mercury is sealed in an inner tube, and a phosphor is coated into a gap between an outer tube and the inner tube. The inner tube is inserted into the outer tube, and before the outer tube is sealed, a slurry containing a phosphor is introduced between the inner tube and the outer tube, so that the phosphor coats the external surface of the inner tube and the internal surface of the outer tube. Alternately, the gap between the inner tube and the outer tube may be completely filled with the phosphor, space may be left between the phosphor on the external surface of the inner tube and the phosphor on the internal surface of the outer tube, or the phosphor may be coated either on the external surface of the inner tube or on the internal surface of the outer tube. After the coating of the tubes with the phosphor has been completed, the opening of the outer tube is closed.

When a filler gas containing mercury and a phosphor are mixed in a single lamp, the mercury and the phosphor may react with each other, with the result that deterioration of the phosphor occurs. Among the fluorescent materials that conventionally have been used, phosphors containing sulphur, such as $Y_2O_2S:Eu^{3+}$ (red), $Gd_2O_2S:Tb^{3+}$ (green) and $ZnS:Ag, Cl$ (blue), react easily with mercury. $CaS:Eu^{2+}$, which because of its excellent transient response properties, is a preferable red phosphor for a time-sequential type liquid crystal display device of the present invention, is also one of the phosphors that react easily with mercury and deteriorate. But since the above described double-tube structure is provided for the fluorescent lamps, there is less of a limitation on the phosphors that can be used for the present invention, and a broader range of materials can be searched to obtain an appropriate material.

The cold-cathode fluorescent lamp of the present invention can be employed together with a color filter to enhance color rendering properties. of course either a red, a green or a blue cold-cathode fluorescent lamp may be combined with a color filter. However, when luminous efficiency property data for various phosphors appropriate for the time-sequential method of the present invention were referred to, and when the degree of enhancement in color rendering properties was observed on a color picture, it was found the color rendering properties were especially enhanced when a red cold-cathode fluorescent lamp and a short-wave cutting color filter were employed together, and when a green cold-cathode fluorescent lamp and a color purity enhancement color filter were employed together. In principle, it is impossible for a conventional liquid crystal display device that uses white illumination to adopt such a color rendering properties enhancement means; however, the color rendering properties enhancement means can he fabricated for the time-sequential type of liquid crystal display device of the present invention, and is a very effective means by which to provide the high performance that is inherent to the time-sequeintial system.

A more detailed explanation will now be given by referring to the preferred embodiments.

Embodiment 1

$(SrMg)_3(PO_4)_2:Sn^{2+}$ was employed as a phosphor to be coated on a red cold-cathode fluorescent lamp; $Y_3Al_3Ga_2O_{12}: Ce^{3+}$ was employed as a phosphor to be coated on a green cold-cathode fluorescent lamp; and $Y_2SiO_5:Ce^{3+}$ was employed as a phosphor to be coated on a blue cold-cathode fluorescent lamp. $(SrMg)_3(PO_4)_2:Sn^{2+}$ was baked using a method proposed by Sarver, et al. (J. F. Sarver, M. V. Hoffman and F. A. Hummel; Journal of the Electrochemical Society, Vol. 108, 1103 (1961)). A phosphor (PYG) for a flying-spot tube sold on the market was employed for $Y_3Al_3Ga_2O_{12}:Ce^{3+}$. Also a phosphor (P47) for another flying-spot tube sold on the market was employed for $Y_2SiO_5:Ce^{3+}$. The phosphors were coated on a glass tube having a diameter of 2 mm and the length of 260 mm, and three types of linear cold-cathode fluorescent lamps that emitted red, green and blue lights.

Figure 5:
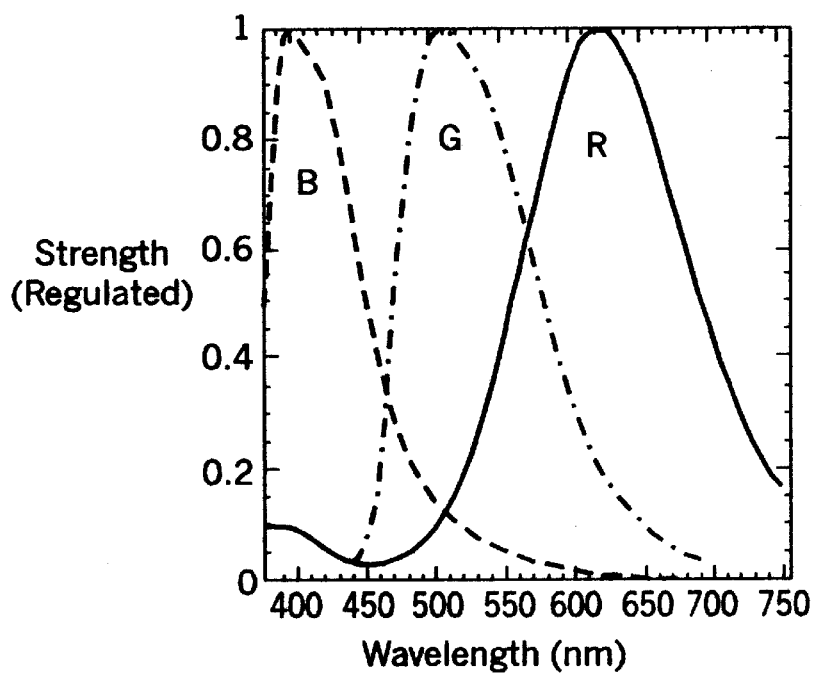
FIG. 5 is a graph showing fluorescence spectrums for cold-cathode phosphors according to the present invention.

In FIG. 5 are shown fluorescence spectrums of the individual phosphors. R, G and B indicate fluorescence spectrums for red green and blue phosphors. The wavelength of an excited light is 254 nm. Since the spectrums for the red and green phosphors spread, the fluorescent lamps were covered with color filters and values for chromaticity was adjusted to improve the color rendering properties.

Figure 6:
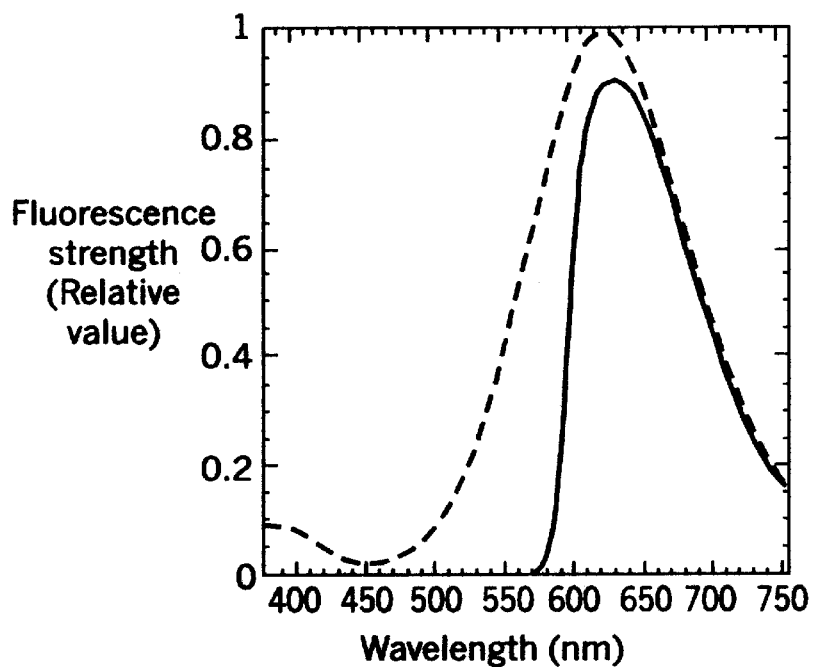
FIG. 6 is a graph showing fluorescence spectrums when a red phosphor and a chromaticity enhancement color filter are assembled to form a single unit.

FIG. 6 is a graph of fluorescence spectrums obtained when a color filter was provided that cut the short wavelength fluorescence from the red phosphor. The xy coordinate values for chromaticity are x=0.6738 and y=0.3260. As a result, excellent color rendering properties were possible.

Figure 7:
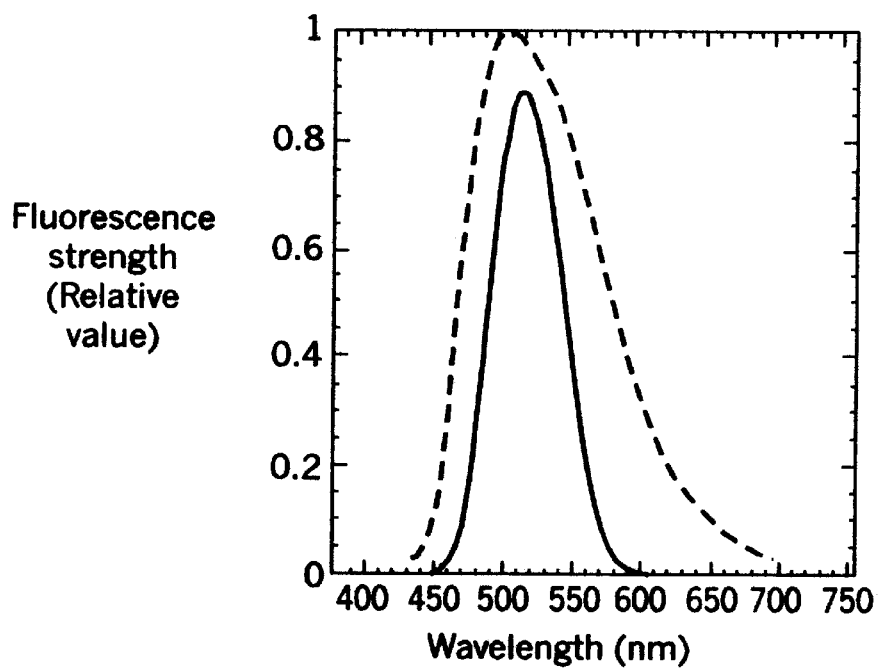
FIG. 7 is a graph showing fluorescence spectrums when a color filter is employed for narrowing a fluorescence spectrum for a green phosphor.
Figure 8:
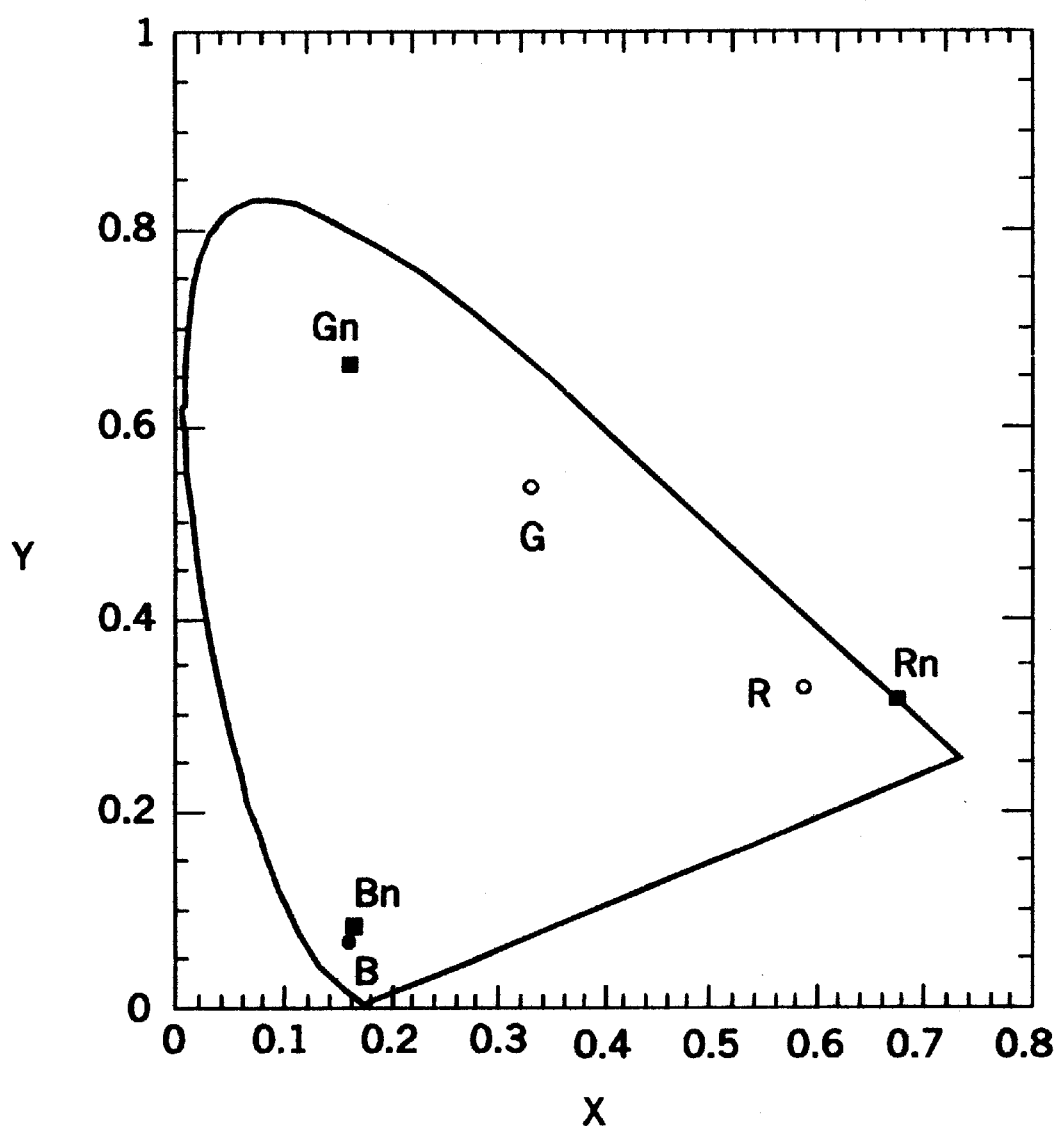
FIG. 8 is a graph showing, along x-y coordinate axes, chromaticity for a conventional phosphor and chromaticity for an assembly comprising a phosphor and a color filter according to the present invention.

FIG. 7 is a graph of fluorescence spectrums obtained when a color filter was employed that narrowed the fluorescence spectrum of the green phosphor. The chromaticity was x=0.1229 and y=0.6075. This chromaticity is used with the chromaticity for the blue phosphor, x=01648 and y=0.0849, a large triangular region enclosed by red, Rn, green, Gn and blue, Bn, can be reproduced for the chromaticity coordinates shown in FIG. 8, and it is apparent that when these fluorescent lamps were employed the color rendering properties were excellent. R, G and B in FIG. 8 represent the chromaticity values of lights emitted by red, green and blue fluorescent lamps on which the conventional phosphors were coated. The color rendering properties are drastically improved by using the phosphors of the present invention and color filters, with the exception that the chromaticity for blue was almost unchanged. The conventional red phosphor is $Y_2O_3Eu^{3+}$ and the green phosphor is $LaPO_4:Ce^{3+}, Tb^{3+}$. The blue phosphor is $BaMgAl_{10}O_{17}:Eu^{2+}$, which has an excellent decay property in rare-earth f-d transition.

Figure 9:
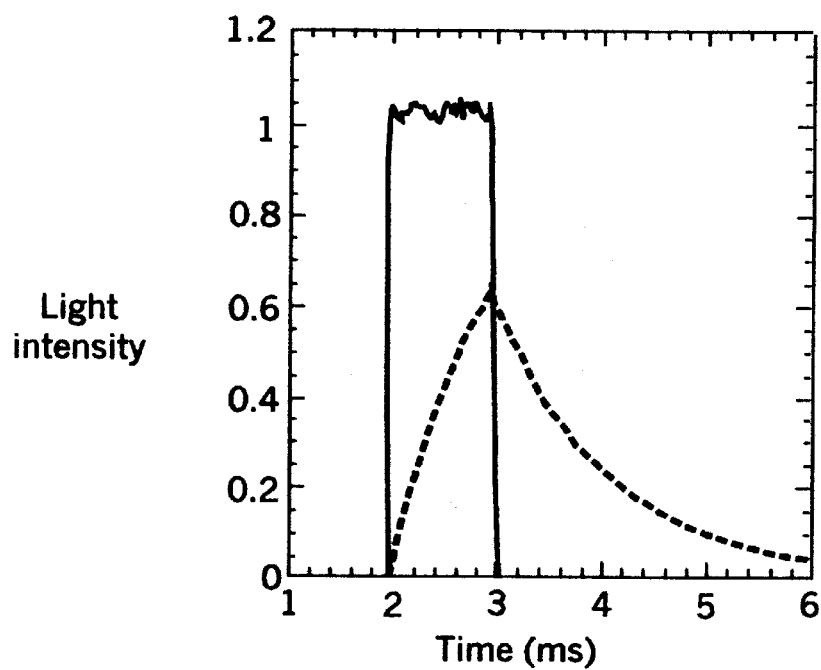
FIG. 9 is a graph showing transient response properties of red phosphors.

FIG. 9 is a graph showing a transient response property when the red phosphors are coated on the cold-cathode fluorescent lamps. The solid line delineates the properties of the phosphor of the present invention, and the broken line delineates the properties of the phosphor used in the background art. A photomultiplier tube was employed to measure the transient change in the strength of emitted light when the fluorescent lamp was turned on with a pulse having a width of 1 ms. For the phosphor (represented by the solid line) of the present invention, the response property obtained was near that of an input pulse waveform. For the conventional phosphor (represented by the broken line), a delay that can not be ignored occurred in the leading property and the decay property. And not only illumination was not performed effectively, but also during the writing of the following picture more light appeared than the quantity of light that was used to illuminate the red picture, and image information was deteriorated. Further, even when the green picture was illuminated, emitted light still remained.

Figure 10:
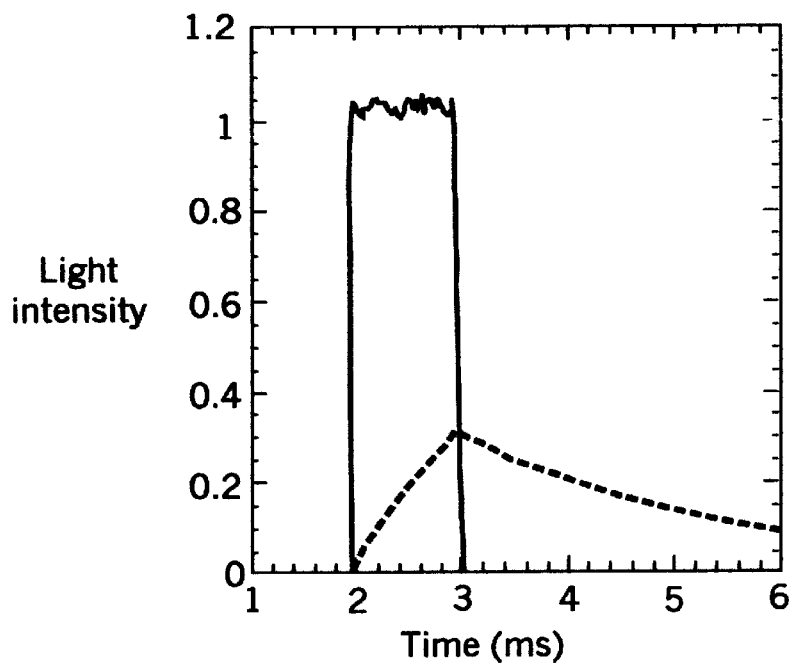
FIG. 10 is a graph showing transient response properties of green phosphors.

FIG. 10 is a graph showing the results obtained when the green phosphor was measured in the same manner. For the phosphor of the present invention, as well as the red phosphor, light that was near the waveform of an input signal could be emitted. when the conventional phosphor was employed, however, the transient response property was worse than that for the red phosphor. Only about ⅙ of the fluorescence comes out when it should emit, and the remaining ⅚ of the fluorescence comes out when it should not been emitted.

Figure 11:
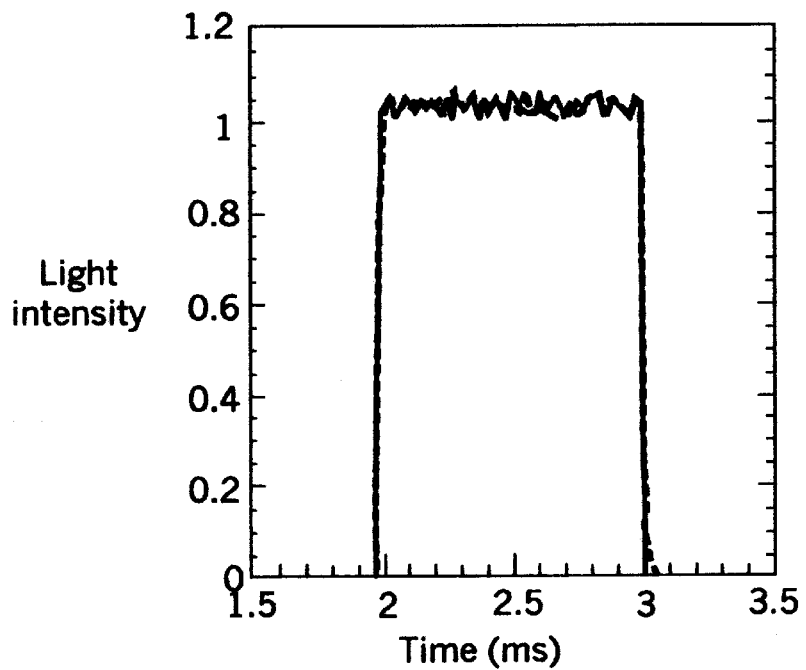
FIG. 11 is a graph showing transient response properties of blue phosphors.

FIG. 11 is a graph showing the results of measurements performed for the blue phosphors. The solid line delineates the results obtained for the phosphor of the present invention, and the broken line delineates the results obtained for the conventional phosphor. The transient response properties for both phosphors are excellent, and the difference between them is small enough to be ignored. Therefore, it is apparent that an inexpensive cerium phosphor can provide the same performance as an expensive europium phosphor, which has been employed as a blue phosphor.

As is apparent from the above results, even when the three conventional phosphors are employed, the field-sharing color display, the fabrication of which is made possible by the present invention, can not be provided.

A liquid crystal display device shown in FIG. 3 was fabricated by assembling liquid crystal having an excellent, fast-response property, and the thus obtained cold-cathode fluorescent lamps for three colors. The three fluorescent lamps were located along the upper and lower longitudinal sides respectively of the liquid crystal display, and the quantity of diffused light was adjusted to provide uniform picture illumination. During a 2 ms period following the completion of the writing to the liquid crystal, the lamps for each color were switched on and an image was displayed at 60 pictures per second. As a result, a preferable image display could be provided when motion images were reproduced. The period of time each picture was illuminated totaled 6 ms for the three colors, and an adequate picture brightness was attained.

Embodiment 2

$(SrMg)_3(PO_4)_2:Sn^{2+}$ was employed as a phosphor for coating a red cold-cathode fluorescent lamp; $Y_3Al_3Ga_2O_{12}:Ce^{3+}$ was employed as a phosphor for coating a green cold-cathode fluorescent lamp; and $BaMgAl_{10}O_{17}:Eu^{2+}$ was employed as a phosphor for coating a blue cold-cathode fluorescent lamp. The same results were acquired as were obtained in Embodiment 1.

Embodiment 3

$(SrMg)_3(PO_4)_2:Sn^{2+}$ was employed as a phosphor for coating a red cold-cathode fluorescent lamp; $Y_3Al_5O_{12}:Ce^{3+}$ (P46YI sold on the market) was employed as a phosphor for coating a green cold-cathode fluorescent lamp; and $Y_2SiO_5:Ce^{3+}$ was employed as a phosphor for coating a blue cold-cathode fluorescent lamp. The same experiment as in Embodiment 1 was conducted and the same transient response property as was obtained in Embodiment 1 was acquired for the green phosphor. Also, preferable results for image display could be obtained in this embodiment. In addition, the same results can be provided by employing any phosphor for a green region so long as it is described as a composition of $Y_3(Al, Ga)_5O_{12}:Ce^{3+}$ and has an Al·Ga ratio other than the $Y_3Al_3Ga_2O_{12}:Ce^{3+}$ in Embodiment 1 and the $Y_3Al_5O_{12}:Ce^{3+}$ in Embodiment 3.

Embodiment 4

A cold-cathode fluorescent lamp was fabricated using $CaS:Eu^{2+}$ as a red phosphor. While this phosphor has an extremely short decay property and a excellent red tint (a peak wavelength of 652.6 nm), it reacts with mercury in a fluorescent lamp and is not employed as a phosphor for a lamp. In this embodiment, however, a cold-cathode fluorescent lamp was fabricated by using double quartz tubes. A filler gas containing mercury was sealed inside an inner tube and the red phosphor was coated in the gap between the outer tube and the inner tube. The phosphor was sealed in the airtight double quartz tubes and no water was absorbed, so that the deterioration of the phosphor was prevented. The green and blue phosphors used in Embodiment 1 were also used for this embodiment. The transient response property of the red phosphor was preferable, and the color reproduction was also excellent.

Advantages of the Invention

According to the liquid crystal display device of the present invention, illumination in a time series of a liquid crystal display device can be effected by employing cold-cathode fluorescent lamps coated with red, green and blue phosphors that have superior color rendering properties (color reproduction) and transient response properties. As a result, a color display can be provided without employing a color filter conventionally required, and accordingly, manufacturing costs can be reduced. Furthermore, since one pixel of a conventional liquid crystal display device is the equivalent of three pixels in this invention, resolution can be further increased. In addition, europium, which is an expensive fluorescent material, can be replaced by inexpensive cerium as the blue phosphor of the present invention, and again, manufacturing costs can be reduced. As a result, not only a computer monitor can be provided that has a large picture and high resolution, but also a wall mounted TV for home use can be fabricated that is characterized by an inexpensive large display picture having the superior dynamic properties.

According to another embodiment, a cold-cathode fluorescent lamp has a double-tube structure whereby mercury vapor and a phosphor are kept separate. Since an ultraviolet generated by an electric discharge produced by the mercury, passes through an ultraviolet transmitting material and excites the phosphor, a phosphor can be employed that, upon contact directly, reacts the mercury and is deteriorated.

Further, according to an additional embodiment of the present invention, a red cold-cathode fluorescent lamp and a short-wavelength cut color filter, and a green cold-cathode fluorescent lamp and a color purity enhancement color filter are employed together. Therefore, light in a wavelength range, the spectrum of which spreads, is cut, and the color rendering properties of red and green can be improved.

It should be understood that various modifications may be made by those skilled in the art without departing from the spirit and scope of the invention.

What is claimed is:

1. A liquid crystal display device capable of providing a multi-color display without color filters having different colors for each pixel, comprising:
   a red cold-cathode fluorescent lamp containing a red phosphor, said red phosphor being from the group comprising $(SrMg)_3(PO_4)_2:Sn^{2+}$ and $CaS:Eu^{2+}$;
   a green cold-cathode fluorescent lamp containing a green phosphor with rapid transient characteristics, and
   a blue cold-cathode fluorescent lamp containing a blue phosphor with rapid transient characteristics,
   said red cold-cathode fluorescent lamp, said green cold-cathode fluorescent lamp and said blue cold-cathode fluorescent lamp being illuminated sequentially at a rapid rate, at mutually exclusive times, and
   a single liquid crystal display element transmitting light for the sequentially transmitted colors to produce composite colors suitable for television or computer displays.

2. The display device according to one of claim 1, wherein said red cold-cathode fluorescent lamp and a color filter for cutting short wave length fluorescence of said red cold-cathode fluorescent lamp are combined, and said green cold-cathode fluorescent lamp and a color purity enhancement color filter are assembled together.

3. The display device according to claim 1, wherein the red phosphor is $(SrMg)_3(PO_4)_2:Sn^{2+}$.

4. A liquid crystal display device capable of providing a multi-color display without color filters having different colors for each pixel, comprising:
   a red cold-cathode fluorescent lamp containing a red phosphor with rapid transient characteristics,
   a green cold-cathode fluorescent lamp containing a green phosphor with rapid transient characteristics, said green phosphor being $Y_3(Al, Ga)_5O_{12}:Ce^{3+}$; and
   a blue cold-cathode fluorescent lamp containing a blue phosphor with rapid transient characteristics,
   said red cold-cathode fluorescent lamp, said green cold-cathode fluorescent lamp and said blue cold-cathode fluorescent lamp being illuminated sequentially at a rapid rate, at mutually exclusive times, and
   a single liquid crystal display element for each pixel to generate a composite color from light transmitted sequentially through the element from at least two of the three fluorescent lamps.

5. The display device according to one of claim 4, wherein said red cold-cathode fluorescent lamp and a color filter for cutting short wave length fluorescence of the red cold-cathode colored fluorescent lamp are combined, and said green cold-cathode fluorescent lamp and a color purity enhancement color filter are assembled together.

6. A liquid crystal display device capable of providing a multi-color display without color filters having different colors for each pixel, comprising:
- a red cold-cathode fluorescent lamp containing a red phosphor with rapid transient characteristics,
- a green cold-cathode fluorescent lamp containing a green phosphor, said blue phosphor being $Y_2SiO_5:Ce^{3+}$;
- a blue cold-cathode fluorescent lamp containing a blue phosphor with rapid transient characteristics,
- said red cold-cathode fluorescent lamp, said green cold-cathode fluorescent lamp and said blue cold-cathode fluorescent lamp being illuminated sequentially at a rapid rate, at mutually exclusive times, and
- a single liquid crystal display element for each pixel to generate a composite color from light transmitted sequentially through the element from at least two of the three fluorescent lamps.

7. The display device according to one of claim 6, wherein said red cold-cathode fluorescent lamp and a color filter for cutting short wave length fluorescence of the red cold-cathode fluorescent lamp are combined, and said green cold-cathode fluorescent lamp and a color purity enhancement color filter are assembled together.

8. A liquid crystal display device capable of providing a multi-color display without color filters having different colors for each pixel, comprising:
- a red cold-cathode fluorescent lamp containing a red phosphor,
- a green cold-cathode fluorescent lamp containing a green phosphor, and
- a blue cold-cathode fluorescent lamp containing a blue phosphor,
- said red cold-cathode fluorescent lamp, said green cold-cathode fluorescent lamp and said blue cold-cathode fluorescent lamp being illuminated sequentially, and
- said red phosphor is from the group comprising $(SrMg)_3(PO_4)_2:Sn^{3+}$ and $CaS:Eu^{2+}$, said green phosphor being $Y_3(Al, Ga)_5O_{12}:Ce^{3+}$, and said blue phosphor being $Y_2SiO_5:C^{3+}$.

9. The display device according to one of claim 8, wherein said red cold-cathode fluorescent lamp and a color filter for cutting a short wave length are combined, or said green cold-cathode fluorescent lamp and a color purity enhancement color filter are assembled together.

10. A liquid crystal display device capable of providing a multi-color display without color filters having different colors being installed for each pixel, comprising:
- a red cold-cathode fluorescent lamp containing a red phosphor with rapid transient characteristics,
- a green cold-cathode fluorescent lamp containing a green phosphor with rapid transient characteristics, and
- a blue cold-cathode fluorescent lamp containing a blue phosphor with rapid transient characteristics,
- said red cold-cathode fluorescent lamp, said green cold-cathode fluorescent lamp and said blue cold-cathode fluorescent lamp being illuminated sequentially, while at least one of said red cold-cathode fluorescent lamp, said green cold-cathode fluorescent lamp and said blue cold-cathode fluorescent lamp is a double-tube cold-cathode fluorescent lamp made of an ultraviolet transmitting material,
- wherein a filler gas containing mercury is sealed in an inner tube and a phosphor is coated in a gap between an outer tube and said inner tube so that phosphor deterioration is minimized, and
- a single liquid crystal display element for each pixel to generate a composite color from light transmitted sequentially through the element from at least two of the three fluorescent lamps.

11. The liquid crystal display device according to claim 10, wherein said double-tube cold-cathode fluorescent lamp contains a red phosphor $CaS:Eu^{2+}$.

12. The display device according to one of claim 11, wherein said red cold-cathode fluorescent lamp and a color filter for cutting short wave length fluorescence of said red cold-cathode fluorescent lamp are combined, and said green cold-cathode fluorescent lamp and a color purity enhancement color filter are assembled together.

13. The display device according to one of claim 10, wherein said red cold-cathode fluorescent lamp and a color filter for cutting short wave length fluorescence of said red cold-cathode fluorescent lamp are combined, and said green cold-cathode fluorescent lamp and a color purity enhancement color filter are assembled together.

14. The display device according to claims 13, wherein said rapid rate is sufficient to have the liquid crystal display device provide flickless images.

* * * * *